United States Patent
Lindstrom et al.

[15] 3,667,493
[45] June 6, 1972

[54] FLOAT VALVE FOR AIR LINE LUBRICATORS

[72] Inventors: Barry E. Lindstrom, Englewood; Donald A. Robb, Denver, Colo.

[73] Assignee: Wilkerson Corporation, Englewood, Colo.

[22] Filed: Dec. 28, 1970

[21] Appl. No.: 101,966

[52] U.S. Cl.................................137/87, 137/429, 137/432
[51] Int. Cl........................................................F16k 33/00
[58] Field of Search...................137/41, 87, 101.25, 101.27, 137/409, 429, 430, 432, 434, 442

[56] References Cited

UNITED STATES PATENTS

| | | | |
|---|---|---|---|
| 520,611 | 5/1894 | Pullman | 137/430 |
| 540,585 | 6/1895 | Doerhoefer | 137/429 |
| 2,189,427 | 2/1940 | Long | 137/432 |
| 534,043 | 2/1895 | Grubb | 137/429 |
| 3,194,258 | 7/1965 | Grant | 137/432 |
| 3,554,219 | 1/1971 | Hudson | 137/432 |

Primary Examiner—Samuel B. Rothberg
Assistant Examiner—W. Wright
Attorney—Anderson, Spangler & Wymore

[57] ABSTRACT

This invention relates to a float-actuated shut-off valve for use in the pressurized reservoir of an air line lubricator to cooperate with the latter upon a drop in the oil level below a predetermined point so as to automatically open an air line to the air pressure within said reservoir and use the resulting pressurized line to either actuate a warning device or shut down the pneumatic equipment dependent upon the system for lubrication.

10 Claims, 5 Drawing Figures

PATENTED JUN 6 1972

3,667,493

INVENTORS
BARRY E. LINDSTROM
DONALD A. ROBB
BY
Anderson, Spangler & Wymore
ATTORNEYS

FLOAT VALVE FOR AIR LINE LUBRICATORS

Air line lubricators are well known in the pneumatic field as a means for introducing fluid lubricants into the air lines powering the various pneumatic devices connected thereto. It is imperative that the pneumatic equipment receive a sufficient supply of lubricant at all times it is in operation although it need not be supplied continuously in all cases.

Automatic bowl refilling systems are commercially available which function to automatically replenish the supply of oil in the lubricator reservoir whenever the oil level drops to a given predetermined level. Such systems are float valve actuated in many instances and they work quite well; however, they call for a network of oil lines leading from the main oil reservoir to the individual bowls, a main reservoir, a pump of some sort, and various manual shut-off valves to keep from draining the lubricant from the system when the pump is shut down. All in all, such a self-replenishing system is expensive and, for this reason, unsuitable for use in many applications from the standpoint of economy.

The most widely used method of replenishing the oil in the lubricators is, of course, a strictly manual one resulting from on-site inspections at frequent intervals or periodic rounds being made to refill all the units regardless of how far down they are. Many users prefer to do this during the night or other off-hours when the equipment is shut down and the danger of accident or injury is less. Even so, there is always the chance that a particular lubricator will run out of oil between inspections and go unnoticed until a piece of valuable pneumatic equipment is ruined or severely damaged.

It has now been found in accordance with the teaching of the instant invention that the aforementioned hazards of the periodic visual inspection method as well as the expense of the fully automatic system can be obviated by the inclusion of a normally closed float valve in the pressurized lubricator reservoir that is responsive to a drop in fluid level to open an auxiliary air line and admit air pressure thereto that can operate either an air-operated warning signal or, alternatively, actuate whatever control is necessary to shut down the pneumatic equipment dependent upon the lubricator as its source of oil. The valve remains closed so as to shut off the inlet to the auxiliary air line whenever the oil level is above the latter. The valve can be used even in opaque bowls thus eliminating the need for a sight-glass. The auxiliary pump, large volume reservoir and drain valves of the fully automatic system are not needed and the resultant low level warning system is every bit as reliable at far less cost.

It is, therefore, the principal object of the present invention to provide a novel and improved float valve for use in combination with an air line lubricator.

A second objective of the invention herein disclosed and claimed is to provide a low oil level warning device for pneumatic systems that eliminates the necessity for periodic visual inspection of the lubricators.

Another object of the invention is the provision of a normally closed float valve that seals the inlet to an air signal line and prevents the movement of oil therein.

Still another objective of the invention forming the subject matter hereof is to provide an automatic shut-off valve that can be used inside opaque lubricator bowls as a reliable indicator of a low oil level therein thus eliminating the need for a sight-glass.

An additional object is the provision of a low oil level warning device for pneumatic systems that does away with the need for the large volume reservoir, the pump and the drain valves of an automatic system.

Further objects of the subject invention are to provide a float-actuated shut-off valve for lubricant-carrying pneumatic systems which is versatile, simple, easy to install, compact, rugged, reliable, inexpensive, decorative and readily adaptable to commercially available lubricator bowls without modification of the latter.

Other objects will be in part apparent and in part pointed out specifically hereinafter in connection with the description of the drawings that follows, and in which.

Figure 1:
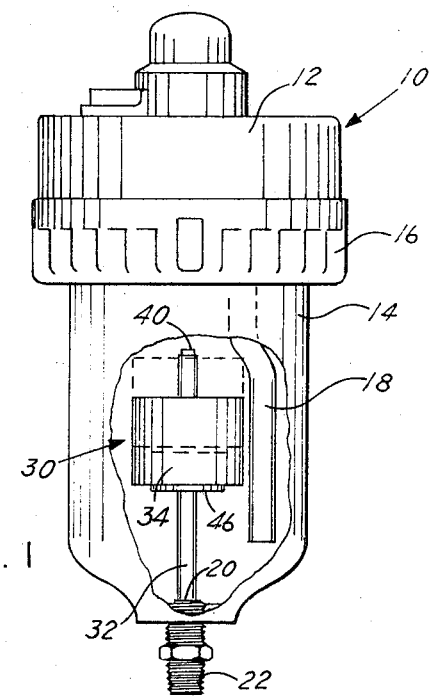
FIG. 1 is an elevational view showing a conventional pneumatic system lubricator with a portion of its bowl broken away to expose the float valve and associated air line installed therein.

Referring next to the drawings for a detailed description of the present invention and, initially, to FIG. 1 for this purpose, reference numeral 10 has been used to designate in a general way a conventional air line lubricator of the type having a head 12 connectable into an air line (not shown), a lubricant reservoir or bowl 14, and a lock ring 16 by means of which the bowl is detachably connected to the head in air-tight sealed relation. In general, lubricators such as the one shown bleed off a portion of the system air and use it to pressurize the bowl. Oil in the bowl is forced up siphon tube 18 where it drips into the main air stream moving on through the head at high velocity where it is atomized and carried on downstream to the tool. In some instances, heavy-walled transparent plastic bowls like the one illustrated are used while in other high pressure applications wire mesh reinforced plastic or opaque metal bowls are used. The smaller lubricators often have an opening 20 in the bottom thereof into which a drain valve (not shown) or some other type of fitting like the externally and internally threaded pipe coupling 22 can be inserted. The larger volume lubricators having the metal-walled reservoirs like that identified by reference numeral 24 in FIG. 5, on the other hand, generally include some type of connector 26 in the side wall that contains an internally threaded opening 28 capable of accepting a threaded pipe fitting 22M.

The float valve of the present invention has been broadly designated by numeral 30 and it will be seen in FIG. 1 to be mounted on an upstanding tubular stem 32 which rises up vertically inside the bowl. The lower end of the stem is threaded to screw into pipe coupling 22 which is, in turn, screwed into the central opening 20 in the bottom. The external portion of coupling 22 would be connected to an auxiliary air line (not shown) which, upon being opened to the air pressure within the bowl, will use said air as the power transfer medium to actuate a suitable warning signal signifying a low oil level or, alternatively, an appropriate air-responsive control adapted upon actuation to shut off the pneumatic tools and machines dependent upon lubricator 10 for lubricating oil. Of course, air-actuated devices operative to initiate either the signaling or shut-down functions above noted are well known in the art and form no part of the present invention.

The oil level in bowl 14 will, under ordinary operating conditions, be high enough to raise float 34 up on stem 32 into the broken line position of FIG. 1 where the inlet 36 (FIGS. 2 and 3) to the stem is closed as will be explained presently. Conversely, when the oil level in the bowl drops to a level where float 34 assumes the full line position of FIG. 1, the inlet to the stem will be open thus admitting the air pressure in the bowl to the auxiliary air line.

Figure 2:
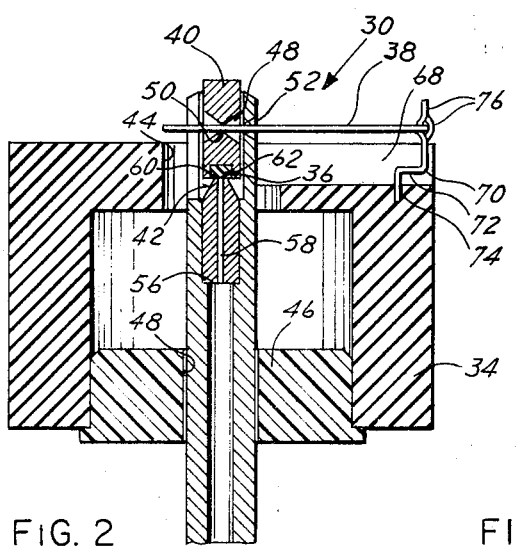
FIG. 2 is a fragmentary diametrical section to an enlarged scale showing the float valve in closed position.
Figure 3:
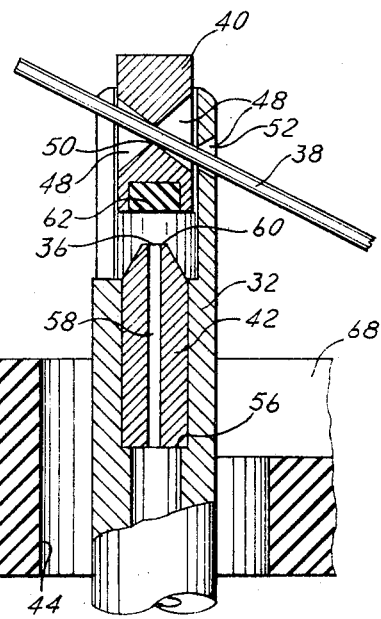
FIG. 3 is a further enlarged fragmentary view, partly in section and partly in elevation showing the float valve in open position.

Next, with reference to FIGS. 2 and 3, it will be seen that the float 34 is operatively connected by means of a lever 38 to a valve element 40 which closes against a seat-forming element 42 located at the inlet 36 of the stem. Float 34, in the particular form illustrated, has an inverted cup-shaped generally cylindrical configuration with an oversize central opening 44 in the top thereof sized to loosely receive the upper end of the stem. The float is, of course, made from some lightweight material having a specific gravity less than that of oil but heavier than air. It must also be chemically inert in oil and introduce no foreign material therein that could foul the pneumatic equipment downstream.

The open underside of the float is closed with a cylindrical plug 46 that contains a central opening 48 (FIG. 2) adapted to receive the stem for free slidable movement relative thereto. The plug also functions as a guide element to prevent the float from becoming tilted or otherwise cocked on the stem. The plug may, of course, be fabricated from a different material than the float but it need have no self-lubricating properties as the oil in the bowl in which the stem and at least the lower portion of the plug remain emersed provides ample lubrication.

Valve element 40 is cylindrical and of lesser outside diameter than the inside diameter of stem 32 so as to reciprocate freely up and down therein. Intermediate the ends thereof is a diametrical passage formed by an aligned pair of outwardly flared frusto-conical openings 48 that merge into one another at approximately the longitudinal center line of the valve element where they cooperate with one another to define a fulcrum 50 for the lever 38 which passes therethrough.

The wall of stem 32 contains an outwardly flared frusto-conical aperture 52, the center of which is in approximate diametrical alignment with the similarly shaped openings 48 in the valve element 40 when the float is in its uppermost position shown in FIG. 2 holding it closed against seat-forming element 42. The portion of the tube wall bordering aperture 52 defined a second fulcrum about which the lever arm 38 pivots to both raise and lower the valve element in response to reciprocating motion of the float in the opposite direction. In other words, the linkage between the valve element and float through the lever arm is such that when the latter goes up, the former comes down and vice versa. A vertical slot 54 is provided in the stem wall opposite aperture 52 adapted to receive the free end of lever arm 38.

In the particular form illustrated in FIGS. 2 and 3, the upper end of the stem is bored out to provide an upwardly facing annular shoulder 56 atop which the seat-forming element 42 rests. This seat element comprises a short cylindrical member with an axial bore 58 therethrough that fits snugly into the bored out upper end of the stem. As illustrated, the upper end of the seat-forming element is frusto-conical and terminates in a flat horizontal sealing surface 60 that is normal to the seat-forming element's axial bore.

The mating surface of the valve element 40 comprises, in the particular form shown, a deformable elastic insert 62 recessed into the bottom thereof. The area encompassed by the insert is substantially greater than the truncated sealing surface 60 of the seat-forming element.

Figure 4:
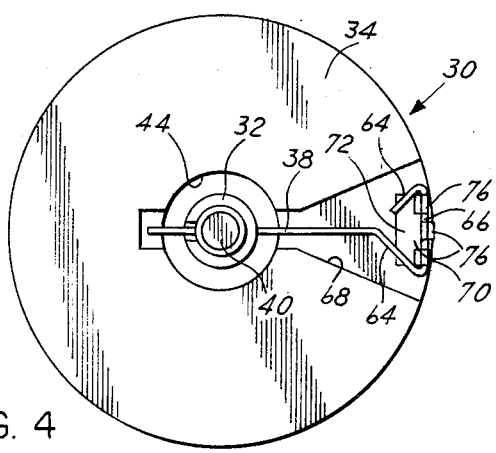
FIG. 4 is a top plan view of the float valve to the same scale as FIG. 2.
Figure 5:
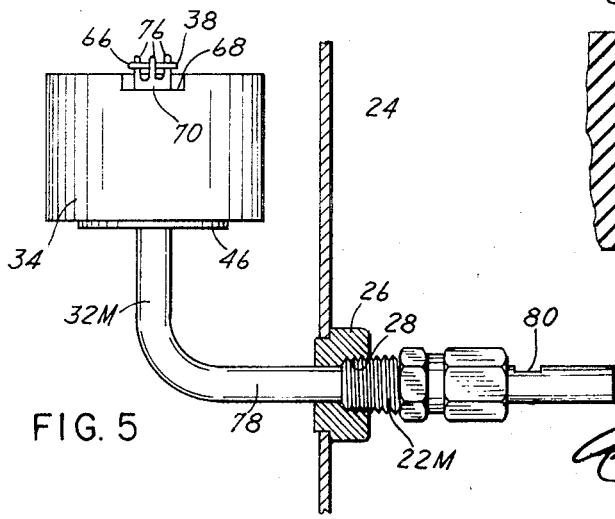
FIG. 5 is a fragmentary view partly in section and partly in elevation showing the float valve to a reduced scale mounted in the side wall of an opaque lubricator reservoir.

Next, with particular reference to FIGS. 2, 4 and 5, it will be seen that the lever arm 38 is hingedly attached to the float 34 for pivotal movement about a horizontal axis essentially tangent to the cylinder defined by the exterior surface of the float although this location has no functional significance. The hinged end of the lever arm is formed into a generally triangular configuration so as to provide a pair of angularly disposed legs 64 joined together by a transverse leg 66 as is most clearly revealed in FIG. 4. The top of the float 38 is notched from the central opening 44 out to the edge thereof so as to define a radially extending outwardly divergent groove 68, at the outer end of which is recessed hinge member 70.

This hinge member is shown as having a substantially horizontal base portion 72 terminating at its inner extremity in a downturned flange 74 that is embedded into the surface of the float within the bottom of the groove 68 and three upturned fingers 76 at the outer edge thereof. The downturned flange 74 is secured within the body of the float by means of a suitable adhesive. The outboard pair of fingers 76 are bent as shown in FIGS. 2 and 4 to curve inwardly around the inside of the transverse leg 66 of the lever arm while the middle finger curves outwardly around the outside of the latter. These three fingers thus cooperate with one another to define a horizontally disposed transversely extending channel therebetween adapted to receive the transverse leg 66 of the lever arm for limited rotational movement therein. The hinge pin defined by the transverse leg of the lever is loosely received between the fingers so that it will not inhibit the motion of either the float or valve element.

Finally with brief reference to FIG. 5, it will be seen that the stem 32M has been modified to include a right-angle bend so that the horizontal leg 78 thereof can emerge through the side wall 24 of an opaque lubricator reservoir. Outboard of fitting 28, a flat 80 is provided which when facing upward in horizontal position indicates that the float is properly positioned inside. In both the FIG. 1 and FIG. 5 versions of the unit, the float will ordinarily be emersed in the oil and the lift exerted by the float due to its buoyancy as it tries to rise to the surface will maintain the valve element 40 tightly seated atop seat-forming element 42 so as to close off the inlet to the stem 32 and prevent any oil from entering the auxiliary air passage.

What is claimed is:

1. A float valve for use within the pressurized oil reservoir of a pneumatic system lubricator as a means for opening an auxiliary air line to said reservoir pressure upon a drop of the oil level in the latter to a predetermined level which comprises: a hollow stem connectable through the wall of the reservoir to an auxiliary air line, said stem having a substantially straight section mountable in vertical position inside said reservoir beneath the normal level of the oil therein, the upper end of said straight section having an opening therethrough defining a fulcrum; means defining a valve seat located in the straight section beneath the fulcrum; a valve member mounted within the upper end of said straight stem section for vertical reciprocating movement between a closed position seated atop the seat-forming means and an open position raised thereabove; float means adapted to float in oil mounted on the stem for reciprocating movement up and down the straight section thereof between a raised and lowered position in response to changes in the oil level within the reservoir; and, a lever arm having its inner end connected to the valve element through the opening in the the stem and the outer end thereof hingedly connected to the float, said lever arm and float cooperating with one another and with the fulcrum to hold the valve element closed against the seat-forming means whenever the oil level in the reservoir is sufficiently high to buoy said float into its raised position, and said elements cooperating with one another upon a lowering of the oil level to a predetermined level below the seat-forming means to lift the valve element free of the latter thus admitting the reservoir pressure to the auxiliary air line while excluding oil therefrom.

2. The float valve as set forth in claim 1 in which: the straight section of the stem is vertically slotted opposite the opening therein to receive the free end of the lever arm.

3. The float valve as set forth in claim 1 in which: the valve member has a passage therethrough adapted to receive the lever arm and permit relative angular movement therebetween, said passage being transversely aligned with the opening in the stem when said valve element is in closed position.

4. The float valve as set forth in claim 1 in which: the seat-forming means comprises a plug with an axial opening therethrough and a frusto-conical upper end portion adapted to mate and form a fluid-tight seal with the adjacent lower end of the valve member.

5. The float valve as set forth in claim 1 in which: the float means comprises an inverted generally cup-shaped right cylindrical element with an oversize axial opening therethrough adapted to loosely receive the straight section of the stem, and a cylindrical plug sized to close the open bottom of said cup-shaped element, said plug having an axial opening therethrough sized to receive the straight section of the stem with a free-sliding fit.

6. The float valve as set forth in claim 1 in which: the opening in the stem is outwardly flared.

7. The float valve as set forth in claim 1 in which: the stem includes a horizontally-disposed section at right angles to the straight section when the latter is in vertical position, said horizontal section including a portion projecting onto the exterior of the reservoir when mounted through the wall thereof, and said projecting portion carrying visible indicia cooperating with the straight section to locate the position of the latter inside the reservoir.

8. The float valve as set forth in claim 3 in which: the passage comprises a pair of opposed outwardly flared frusto-conical openings arranged in transverse alignment so as to intersect one another and define a second fulcrum for the lever arm.

9. The apparatus for indicating a low oil level in a pneumatic system lubricator which comprises in combination: a lubricator of the type having a pressurized oil reservoir connectable into a main air line of a pneumatic system; an auxiliary air line connectable to an air-operated low oil level warning device; and, a normally closed float-actuated shut-off valve located within the oil reservoir and connected to the auxiliary air line, said valve including an upstanding tubular stem within the reservoir connected through the wall thereof to the auxiliary air line, a seat within said stem, a valve member mounted within said stem for reciprocating movement between a closed position against the seat and an open position raised free thereof, a float member responsive to changes in the oil level within said reservoir, and link means operatively interconnecting the float and valve members so as to maintain the latter in closed position when the oil level in the reservoir is at or above a predetermined minimum level, and said operatively interconnected elements also cooperating upon a drop in the oil level below said predetermined minimum to raise said valve element into open position thus admitting the reservoir pressure to the auxiliary air line.

10. The apparatus as set forth in claim 9 in which: the predetermined minimum oil level is selected to lie beneath the inlet to the stem so that no oil will enter the auxiliary air line when the valve opens.

* * * * *